United States Patent
Keck

[15] 3,664,089
[45] May 23, 1972

[54] EQUIPMENT FOR FORMING A STACK OF BRICKS OR OTHER ARTICLES AND FOR INTERLEAVING SUCCESSIVE LAYERS WITH THERMOPLASTIC FILM MATERIAL

[72] Inventor: Dieter Keck, Laggenbeck, Germany
[73] Assignee: C. Keller u. Co., Laggenbeck, Germany
[22] Filed: Nov. 9, 1970
[21] Appl. No.: 87,900

[30] Foreign Application Priority Data
Nov. 21, 1969 Germany..................P 19 58 522.9

[52] U.S. Cl.................................53/199, 53/157, 53/389
[51] Int. Cl. .................................B65b 41/12, B65b 27/02
[58] Field of Search.....................53/117, 157, 159, 199, 389; 214/6 P, 10.5 R; 270/30, 31, 79

[56] References Cited

UNITED STATES PATENTS

| 3,296,768 | 1/1967 | Lotz | 53/389 X |
| 3,506,254 | 4/1970 | Stumpf | 270/31 |
| 3,513,625 | 5/1970 | Eller et al. | 53/157 X |
| 3,516,226 | 6/1970 | Grasvoll | 53/159 X |
| 3,585,777 | 6/1971 | Pesch | 53/157 X |

*Primary Examiner*—Robert L. Spruill
*Attorney*—Mason, Mason & Albright

[57] ABSTRACT

Equipment for inserting a thermoplastic film material in zig-zag formation between layers of bricks comprises a roller conveyor for supporting the bricks and a support system for a roll of the film material. Drive motors cooperate to move the roll to and fro so that successive passes lay down a length of film material between each layer of bricks. When a stack is complete an outer covering is wound round the stack.

7 Claims, 6 Drawing Figures

Patented May 23, 1972

INVENTOR
DIETER KECK

BY Mason, Mason & Albright
ATTORNEYS

Patented May 23, 1972 3,664,089

INVENTOR
DIETER KECK
BY
Mason, Mason & Albright
ATTORNEYS

Patented May 23, 1972 3,664,089

INVENTOR
DIETER KECK

BY
Mason, Mason & Albright
ATTORNEYS

EQUIPMENT FOR FORMING A STACK OF BRICKS OR OTHER ARTICLES AND FOR INTERLEAVING SUCCESSIVE LAYERS WITH THERMOPLASTIC FILM MATERIAL

BACKGROUND OF THE INVENTION

The invention relates to equipment for forming and wrapping a stack of bricks or other articles of identical shape.

The object of the invention is to provide improved such equipment.

SUMMARY OF THE INVENTION

According to the present invention there is provided equipment for forming a stack of articles in which stack layers of articles are arranged one above the other with sheet material disposed between each layer and the next, while the top and bottom layers and two vertical end faces of the completed stack are also covered with said sheet material, so as to produce a wrapped stack, said equipment comprising conveyor means for supporting the stack, a sheet material-carrying drum, structure for supporting the drum for traversing motion relative to the conveyor means, a clamping device for clamping an end portion of the sheet material, means for moving the clamping device vertically, drive means for effecting said traversing motion of the drum, and control means to allow the clamping device to move downwardly initially and the drum to move transversely whereby an initial length of sheet material is unwound from the drum and laid on the conveyor means and subsequent deposition of a layer of articles on the unwound sheet material being followed by further transverse motions and depositions of rows until the stack has been completed, the control means then acting to bring the clamping means to an upper position and to release the sheet material.

BRIEF DESCRIPTION OF THE DRAWINGS

An embodiment of equipment in accordance with the invention will now be described, by way of example, with reference to the accompanying diagrammatic drawings, in which.

DESCRIPTION OF THE PREFERRED EMBODIMENT

Figure 1:
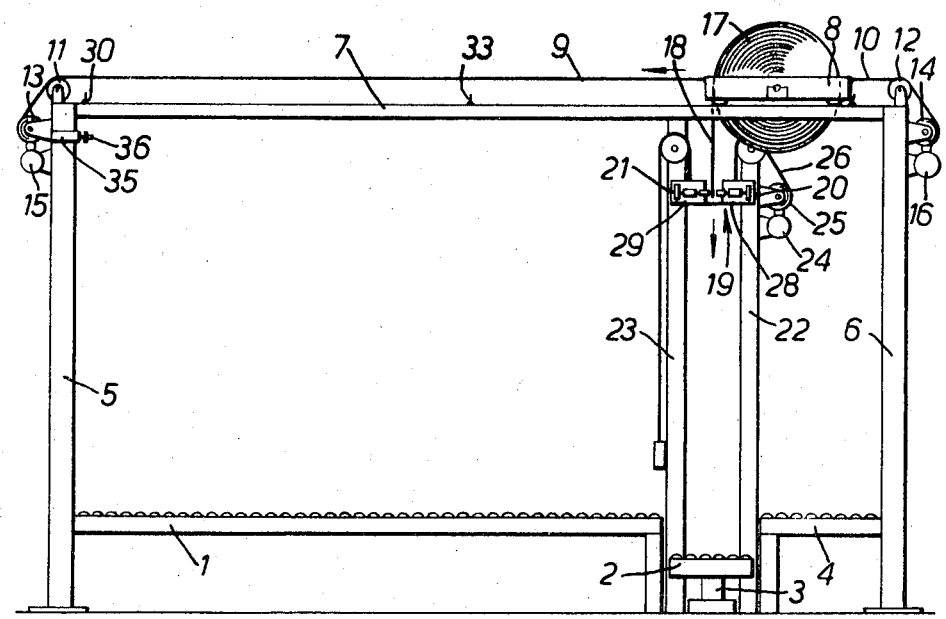
FIGS. 1 to 5 illustrate the equipment in various working configurations.

The equipment includes a conveyor 1, in the form of a roller track, in which the rollers can be driven by suitable means (not shown). Adjacent to this conveyor is another conveyor 2, which is likewise in the form of a roller track, but the rollers of which cannot be driven. The conveyor 2 can be lowered and can be raised to the level of the conveyor 1 by a hydraulically-operated piston or other actuating means.

Associated with the two conveyors 1 and 2 is a third conveyor 4, again in the form of a roller track in which the rollers can be driven.

By raising the conveyor 2, the vertical spacing between the two associated conveyors 1 and 4 can be closed.

At each side of the equipment, at the ends of the conveyor 1, are upright supports 5 and 6, to which is secured a cross-beam 7, on which a travelling cradle 8, can be moved backwards and forwards.

Motion is imparted to this travelling cradle 8 by ropes or cables 9 and 10, which pass round guide pulleys 11 and 12 at each end of the beam 7, to take-up drums 13 and 14 mounted adjacent the upper end of the respective supports 5, 6.

These take-up drums 13 and 14 are driven by drive motors 15 and 16.

Mounted in bearings on the cradle 8 is a drum 17 wound with plastics foil or thin plastics sheeting 18, which is drawn from the drum 17 by a mechanism described hereinafter.

Above the conveyor 2 is a frame-mounted clamping device 19, which can be raised and lowered by means of rollers 20 and 21, running on vertical guide bars 22 and 23. The drive is taken from a motor 24, which acts through a take-up drum 25, a rope 26, and a guide pulley 27, to provide the upward movement. The downward movement is effected by the self-weight of the clamping device 19.

Within the clamping device 19 are fluid-pressure operated actuators comprising pistons 28 and 29, which work in cylinders and can be driven in opposite directions to produce a closing movement, so that the hanging end of the foil 18 is clamped (FIG. 1).

The mode of operation of the equipment according to the invention, is as follows:

As soon as the end of the foil 18 has been gripped by it, the clamping device 19 moves to its lower extreme position, drawing the foil 18 from the drum 17 as it goes. When the clamping device 19 reaches its lower terminal position, it is level with the conveyors 1 and 4, the conveyor 2 having been lowered to enable the clamping device 19 to move unhindered into the thus vacated space.

Simultaneously with the lowering of the clamping device 19, the cradle 8 moves leftward, carrying the drum 17 to its extreme position adjacent to the support 5, where a switch 30 in the motor circuit, with which the cradle 8 comes into contact, stops the movement.

Figure 2:
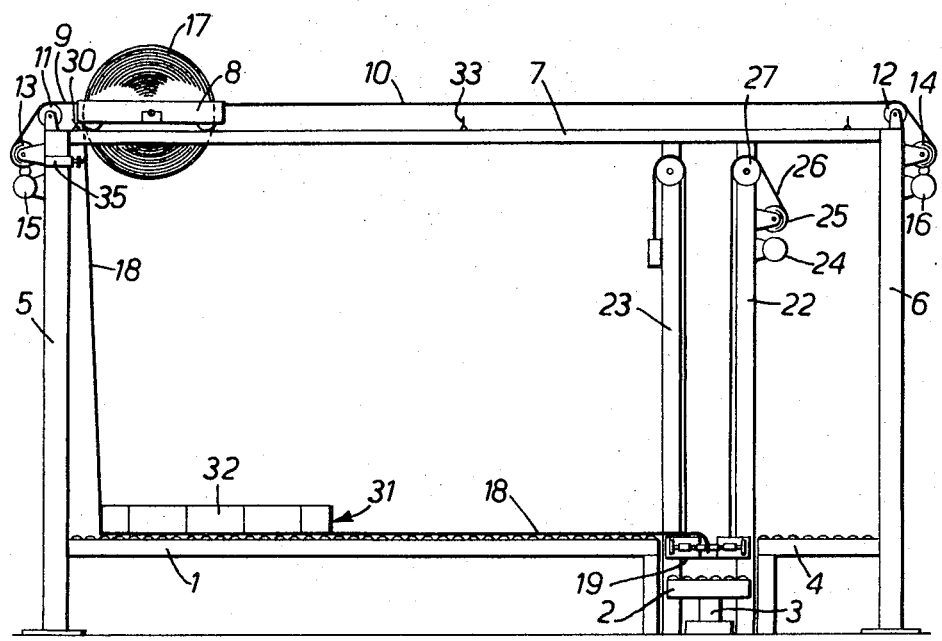

As this takes place, the foil 18 is drawn off the drum 17 and under its self-weight lies flat on the conveyor 1, so that an initial layer 31, of articles such as the bricks 32 can be deposited on the foil 18 (FIG. 2). The layer or row is moved in from the right so that if enough foil has not been drawn off the drum 17, the self-weight of the article will ensure that a further length is drawn off.

Figure 3:
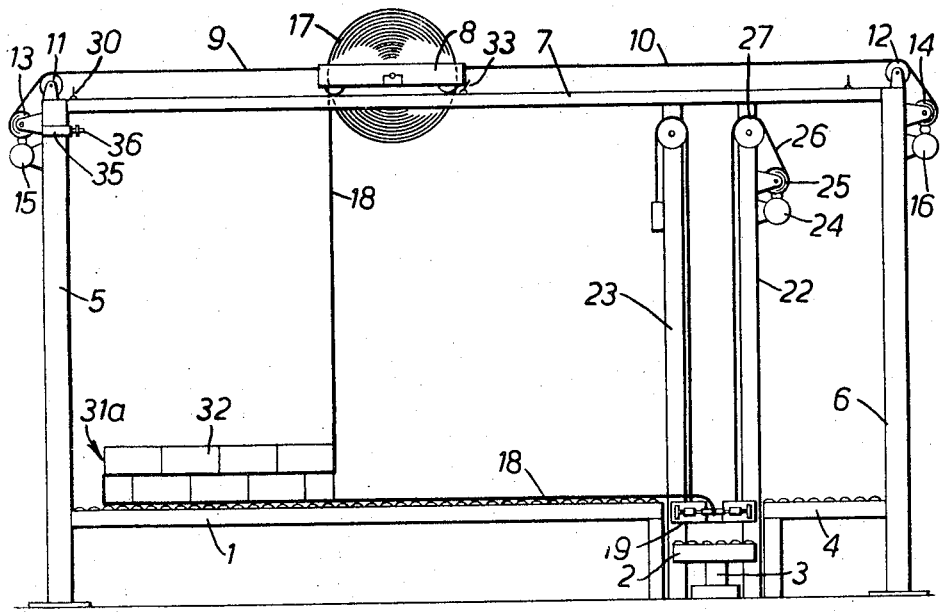

As soon as that has been done, the cradle 8 moves to the right, into an intermediate position which lies approximately in the center of the cross-beam 7 and is determined by a switch 33, operated only by movement of, from left to right, the cradle 8. As this takes place, further foil 18 is drawn from the drum 17, so as to cover the initial layer 31. Another layer 31a of bricks 32 is now brought up and laid on top of the initial layer 31, leaving foil 18 between the layers 31 and 31a (FIG. 3).

In this way, by depositing further layers of bricks on top of one another, a stack 34 is formed as the cradle 8 travels alternately from the left-hand position, adjacent to the support 5, to its intermediate position and back again. As a result of the zig-zag formation of the foil 18 consequent upon the movement of the cradle 8 to and fro, the foil 18 comes to lie between the individual layers such as, for example, 31 and 31a.

Figure 4:
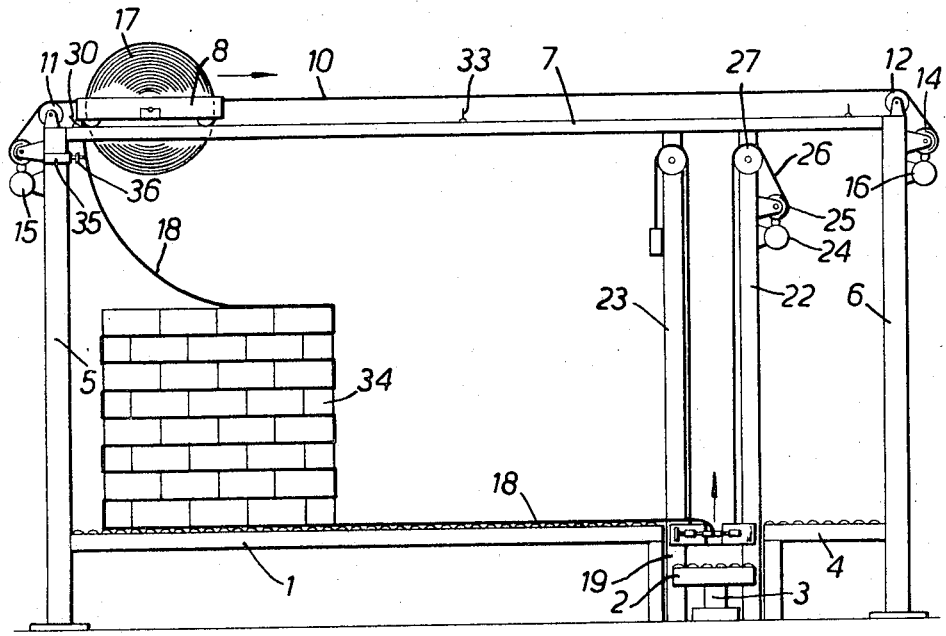
Figure 5:
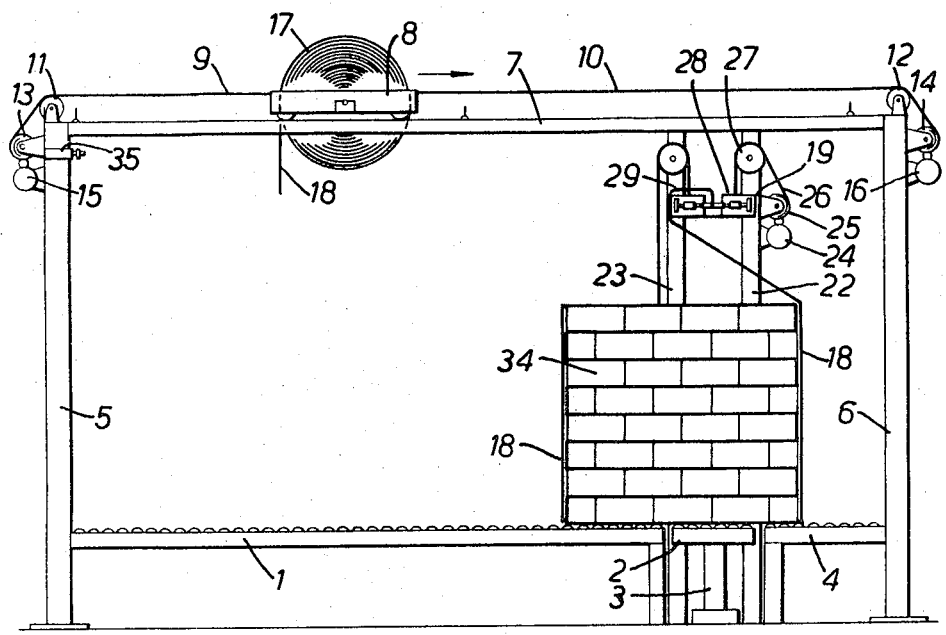
Figure 6:
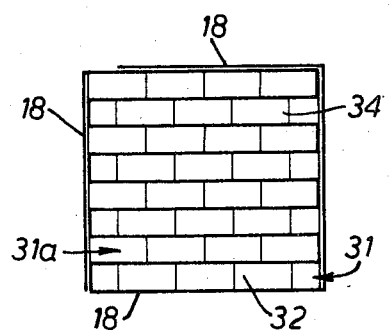
FIG. 6 shows a stack of bricks wrapped by the equipment in accordance with the invention.

Once the topmost layer has been deposited, a cutting device 35, which comprises a moving piston connected to a heated wire 36, comes into action and cuts off the foil 18 (FIG. 4), so that the free end of the foil 18 hangs down from the drum 17, while the other, cut end portion of the foil 18 drops down and covers that face of the stack 34 which lies towards the support 5 (FIG. 5).

Drive is now applied to the rollers of the roller conveyor 1 and the stack 34 moves towards the support 6. At the same time, the clamping device 19 and the conveyor 2 moves upwards.

As the conveyor 2 moves upwards the gap left by the clamping device 19 is closed so as to produce a continuous conveyor surface, while the free end portion of the foil lying on the conveyor 1 is carried upwards by the clamping device 19. During the further movement of the stack 34, the end of the foil 18 is brought into contact with that side of the stack 34 which faces towards the support 6 (FIG. 5).

The clamping device 19 is now adjusted by the pistons 28 and 29 to its open position and the end portion of foil hitherto gripped falls on to the upper face of the stack 34, thus producing a stack surrounded by foil on all sides. This stack 34 is conveyed for contraction in the normal way to a kiln downstream of the device here proposed, in which the foil is subjected to a shrinkage process, so that it clings tightly to the stack, thereby producing a unit that can safely be transported.

I claim:

1. Equipment for forming a stack of articles in which stack layers of articles are arranged one above the other with sheet material disposed between each layer and the next, while the top and bottom layers and two vertical end faces of the completed stack are also covered with said sheet material, so as to produce a wrapped stack, said equipment comprising
   conveyor means for supporting the stack,
   a sheet material-carrying drum,
   structure for supporting the drum for traversing motion relative to the conveyor means,
   a clamping device for clamping an end portion of the sheet material,
   means for moving the clamping device vertically,
   drive means for effecting said traversing motion of the drum, and
   control means to allow the clamping device to move downwardly initially and the drum to move transversely whereby an initial length of sheet material is unwound from the drum and laid on the conveyor means and subsequent deposition of a layer of articles on the unwound sheet material being followed by further transverse motions and depositions of rows until the stack has been completed, the control means then acting to bring the clamping means to an upper position and to release the sheet material.

2. Equipment according to claim 1 comprising
   two further conveyor means and means for raising and lowering one of said further conveyor means relatively to the other said further conveyor means and relatively to the first-mentioned conveyor means.

3. Equipment according to claim 1, wherein said control means comprises switches for controlling said horizontal motion of the drum.

4. Equipment according to claim 1, comprising a travelling cradle rotatably supporting the drum, and two motors one being coupled to drive the cradle in one direction of horizontal travel and the other in the opposite direction.

5. Equipment according to claim 1, comprising a sheet material cutting device and means for heating the cutting device.

6. Equipment according to claim 1, comprising rollers mounted on the clamping device, and guide means on which the clamping device rollers can move.

7. Equipment according to claim 1, wherein said clamping device comprises fluid-pressure operated actuators.

* * * * *